United States Patent
Premji et al.

(10) Patent No.: US 12,425,328 B2
(45) Date of Patent: Sep. 23, 2025

(54) PRIORITY BASED ROUTE PROGRAMING AND ADVERTISING

(71) Applicant: Arista Networks, Inc., Santa Clara, CA (US)

(72) Inventors: Ariff Premji, Kirkland, WA (US); Manikandan Arumugam, Sunnyvale, CA (US); Urvish Mukundbhai Panchal, Woodinville, WA (US); Jaimeen Paresh Parmar, Redmond, WA (US)

(73) Assignee: Arista Networks, Inc., Santa Clara, CA (US)

( * ) Notice: Subject to any disclaimer, the term of this patent is extended or adjusted under 35 U.S.C. 154(b) by 326 days.

(21) Appl. No.: 17/891,567

(22) Filed: Aug. 19, 2022

(65) Prior Publication Data

US 2024/0064089 A1    Feb. 22, 2024

(51) Int. Cl.
*H04L 45/02* (2022.01)
*H04L 45/302* (2022.01)
*H04L 45/655* (2022.01)

(52) U.S. Cl.
CPC ............ *H04L 45/04* (2013.01); *H04L 45/302* (2013.01); *H04L 45/655* (2022.05)

(58) Field of Classification Search
CPC ...... H04L 45/04; H04L 45/302; H04L 45/655
See application file for complete search history.

(56) References Cited

U.S. PATENT DOCUMENTS

| | | | |
|---|---|---|---|
| 7,710,899 B1 * | 5/2010 | Ward | H04L 45/04 370/254 |
| 9,559,936 B2 | 1/2017 | Semwal et al. | |
| 9,729,427 B2 | 8/2017 | Fenner et al. | |
| 2007/0121524 A1 * | 5/2007 | Rangarajan | H04L 45/033 370/252 |
| 2011/0238915 A1 * | 9/2011 | Kikuchi | G06F 12/0866 711/118 |
| 2017/0346727 A1 * | 11/2017 | Perrett | H04L 45/28 |

FOREIGN PATENT DOCUMENTS

WO    WO-2008037187 A1 *    4/2008    ............. H04L 45/04

\* cited by examiner

*Primary Examiner* — Derrick V Rose
(74) *Attorney, Agent, or Firm* — Tianyi He

(57) ABSTRACT

Methods and devices for distributing routes in a network are disclosed. The methods include identifying priority routes for a plurality of routes in a network device. The method also includes establishing communications with a neighboring network device and sending a first set of routes of the plurality routes to the neighboring network device. The first set of routes is selected based on a relative priority of the first set of routes to non-selected routes of the plurality of routes. The neighboring network device receives the first set of routes, and writes the first set of routes to forwarding hardware of the neighboring network device. The programmed routes are then used to route packets in the network.

20 Claims, 8 Drawing Sheets

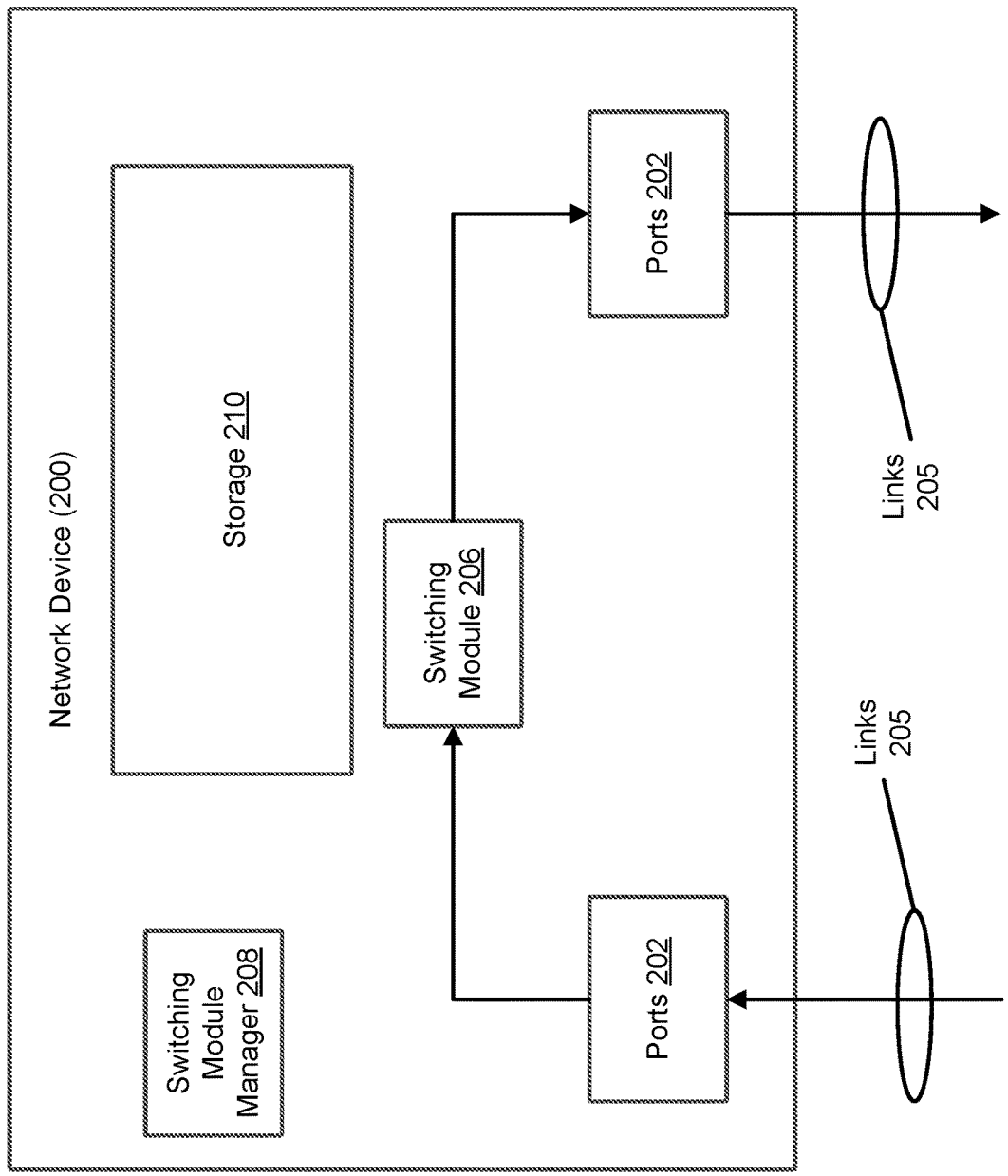
FIG. 2.1

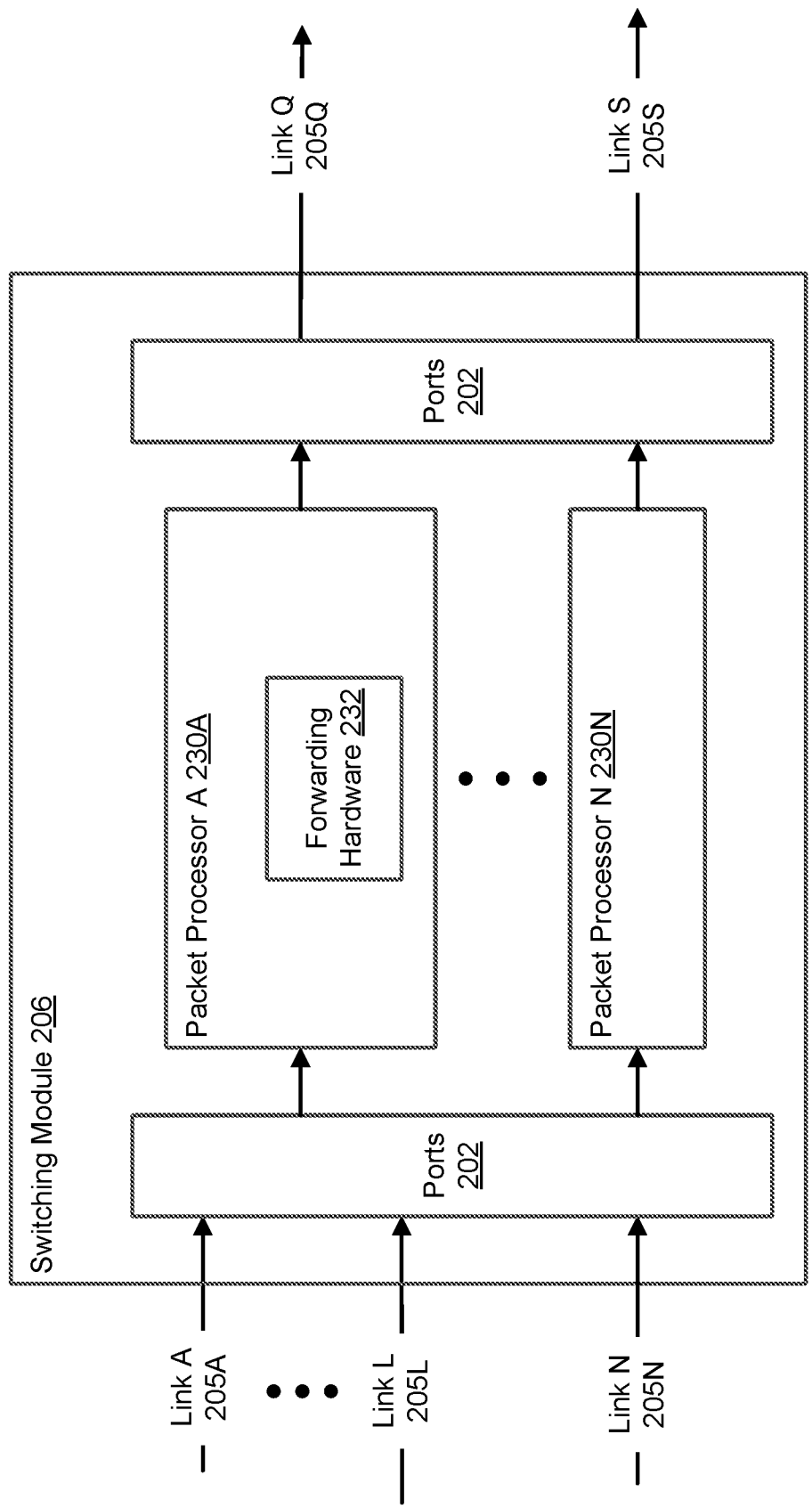
FIG. 2.2

PRIORITY BASED ROUTE PROGRAMING AND ADVERTISING

BACKGROUND

Information technology (IT) networks may include numerous interconnected computing devices, routers, switches and/or other network elements. Multiple devices may communicate with each other to provide their respective functionalities. For example, the devices may send data representing information necessary for the multiple devices to provide their functionalities.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 2.1 shows a diagram of a network device in accordance with one or more embodiments herein.

FIG. 2.2 shows a diagram of a switching module in accordance with one or more embodiments disclosed herein.

DETAILED DESCRIPTION

Figure 1:
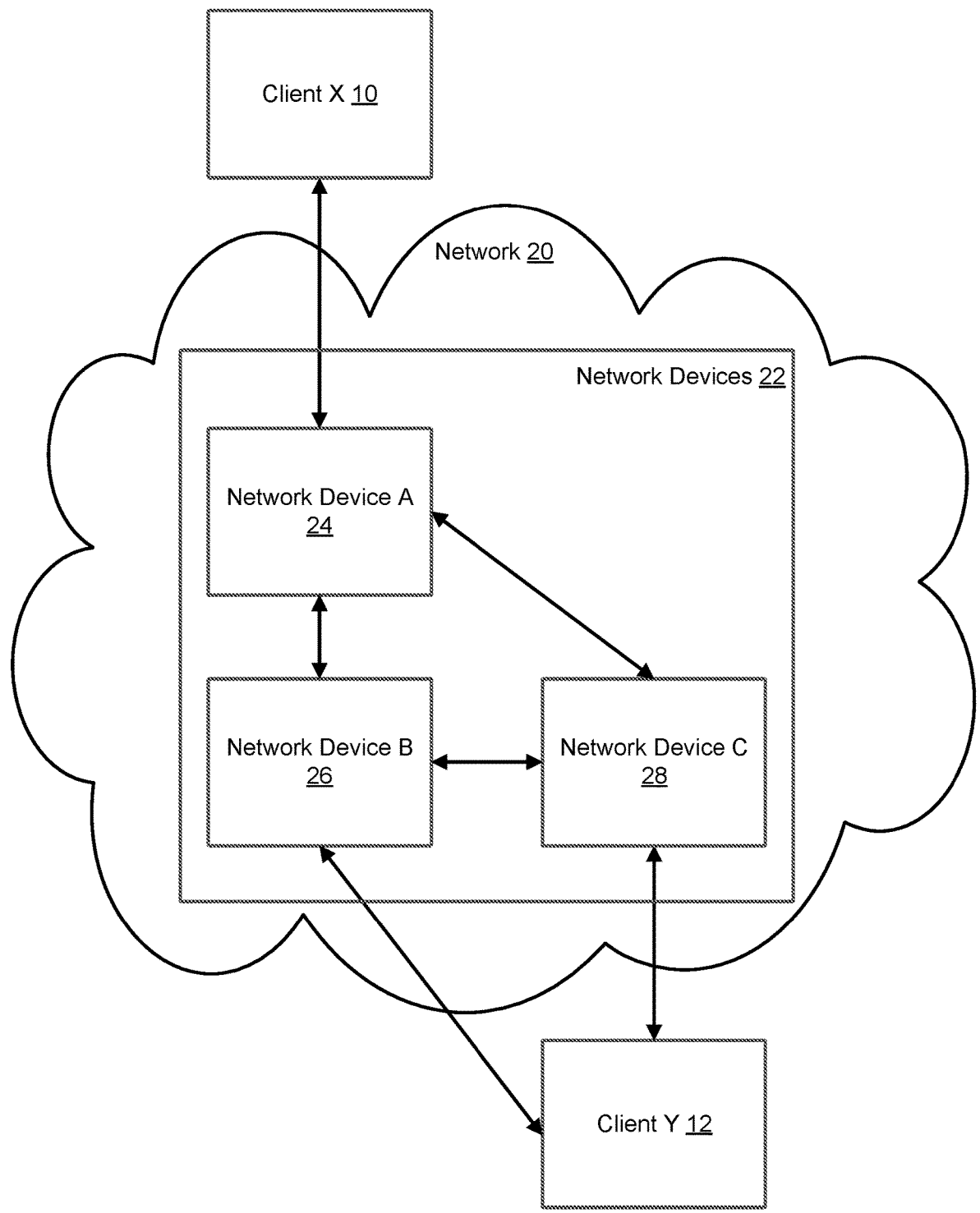
FIG. 1 shows a diagram of a system in accordance with one or more embodiments disclosed herein.

Networks facilitate the transmission of packets from a source computing device to a target computing device. The transmission of packets includes receiving a packet by a network device in the network and then determining to which network device to forward the packet, with the ultimate goal of transmitting the packet to a target computing device. Networks include computing devices (e.g., servers, databases, etc.) and network devices (e.g., routers, switches, etc.). The network devices enable the computing devices to communicate with each other as well as to communicate with other computing devices connected via wide area networks (e.g., the Internet). In order to facilitate the communication, the network devices utilize routing protocols, such as border gateway protocol (BGP), to exchange routes. These routes are then used to enable the aforementioned communication between the computing devices as well as enable communication between the network devices.

When a network device is initially started or power cycled (i.e., the network device is turned off and then back on), the network device needs to obtain routes from the other network devices, which may be referred to as neighbors. Traditionally, once the network device establishes communication with its neighbors, the neighbors transmit routes (via advertisements) to the network device. The network device, upon receipt on these routes, programs the routes into its forwarding hardware based on a first-in first-out (FIFO) mechanism. Said another way, the routes are programmed in the order in which they are received.

This approach may result in certain critical routes not being programmed for an extended prior of time. More specifically, there are certain routes, also known as critical routes, which enable the network device to send packets associated with critical services in the network (e.g., provisioning servers, authentication services, etc.). When the network device is delayed in programming these critical routes, network devices and the computing devices in the network may be unable to access these critical services.

To address the aforementioned issue, embodiments disclosed herein are directed to the operation of the network devices in distributing routes, including route advertisement and route programming. In general, embodiments disclosed herein relate to configuring a network device to perform routing of packets in a network. More specifically, embodiments include initializing the network device in preparation for activating the network device's routing functionality.

When a network device in accordance with embodiments powers on, the network device's knowledge about the surrounding network and available routes may be incomplete. For example, there may be no route information for some destination IP address ranges, and/or the cost of the routes the network device is aware of may be higher than necessary, i.e., shorter routes, requiring fewer "hops" to a destination, may exist. Therefore, during a boot phase of the network device, occurring for example when the network device is powered on, a network device in accordance with embodiments may gather route information from peer network devices in order to complete the network device's knowledge about the surrounding network environment and available routes.

Embodiments disclosed herein include network devices advertising routes and programming routes in a manner that identifies critical routes and prioritizes the critical routes (over non-critical/less critical routes) when communications are established. Further, embodiments may establish varying levels of criticality for routes programmed and/or advertised.

For example, routes important to the infrastructure of the network are prioritized to maintain access to critical infrastructure in the event of unplanned outages. For example, routes to critical infrastructure provide access to terminal utilities, authentication, authorization, and accounting (AAA) servers, logging servers, etc. The critical routes may be identified by a network operator when establishing common configuration policies on all devices in the domain. By prioritizing the critical infrastructure routes, the downtime during unplanned outages may be reduced.

Embodiments disclosed herein may store priority information in the forwarding hardware of the network device. Such priority information may take the form of an indicator (e.g., tag, flag, etc.) or a value that indicates a priority ranking (e.g., value of 1-6, with 1 being the highest priority and 6 being the lowest). The priority for different routes may be established by a network operator according to a desired policy.

In one or more embodiments, an indicator, such as a tag, is used to identify routes to be treated as critical routes. In such embodiments, there are only two classes of routes—critical and non-critical, the critical routes being associated with a given indicator. A network operator may identify high priority routes, such as routes critical to the infrastructure of the network, and store the indicator with the identified routes in accordance with embodiments herein.

Embodiments may also store a value with routes that indicate a priority. For example, six levels of routes may be established. In such embodiments, all the routes are associated with a value corresponding to their level of criticality. Continuing the example, a priority value of 1 may be assigned to routes deemed critical to the infrastructure; a priority value of 2 may be assigned to a default route (e.g., 0.0.0.0/0); and priority value of 3 may be assigned to aggregate routes. A priority value of 6 may be assigned to any remaining routes, or routes received that may not have a priority value.

In this example, a network operator may associate a prefix with any of the six priorities. Further, by categorizing the default route as priority 2 and aggregate routes as priority 3, these routes are not only prioritized, but differentiated from the rest of the routes. In this example, priority values of 4 and 5 may be used on a case-by-case basis. For example, some routes may be given a priority of 4 and some routes may be given a priority of 5 in order to differentiate these sets of routes from the remaining routes, and each other.

One of ordinary skill in the art will appreciate that embodiments are not limited to the six level priority ranking given in the example above. Embodiments may include any number priority levels provided an indication of the level is associated with a given route.

In embodiments disclosed herein, network devices establish communication with neighboring devices to exchange route information. For example, the border gateway protocol (BGP) may be used. A network device establishes a communication, or neighbor-ship, with peer network devices. During a convergence phase, the network device may receive route updates, i.e. information about available routes to network destinations, from some or all of the peer network devices with which the network device has established communication.

The network device may need to process the received routes before being able to send packets over these newly learned routes. Processing the received routes may include writing the routes into forwarding hardware, or a forwarding information base (FIB), that the network device may rely on in order to make routing decisions when packets are processed. The forwarding hardware may be implemented by hardware optimized for high-speed lookups of routes, thus enabling rapid forwarding of packets.

Subsequently, the network device may signal to other network devices that it may be able to send packets over the newly learned routes by advertising the newly learned routes to the peer network devices. In one or more embodiments, the network device may not advertise newly learned routes until the routes have been written to the forwarding hardware. This can avoid scenarios where the network device may have to drop packets because the route over which the packets are to be sent has not been programmed into the forwarding hardware at the time the packets are processed.

Embodiments disclosed herein also prioritize the advertisement of critical routes (over non-critical routes/over less critical routes) when communications are established with peer network devices. In this manner, even if a legacy network device is incapable of storing priorities associated with routes, higher priority routes are received first and thus, programmed into the forwarding hardware first in accordance with standard first-in-first-out (FIFO) procedures.

In one or more embodiments, portions of the network device forwarding hardware in which to program the most critical routes is reserved to ensure that there is space in the forwarding hardware to store critical routes. Further, by reserving a portion of the forwarding hardware, critical routes may not be removed or overwritten in the forwarding hardware.

In the text that follows, a description of components of a system in accordance with embodiments disclosed herein is provided with respect to FIGS. 1-2.2. A description of a data structure that may be used by the system of FIG. 1 is provided with respect to FIG. 3.

Figure 4:
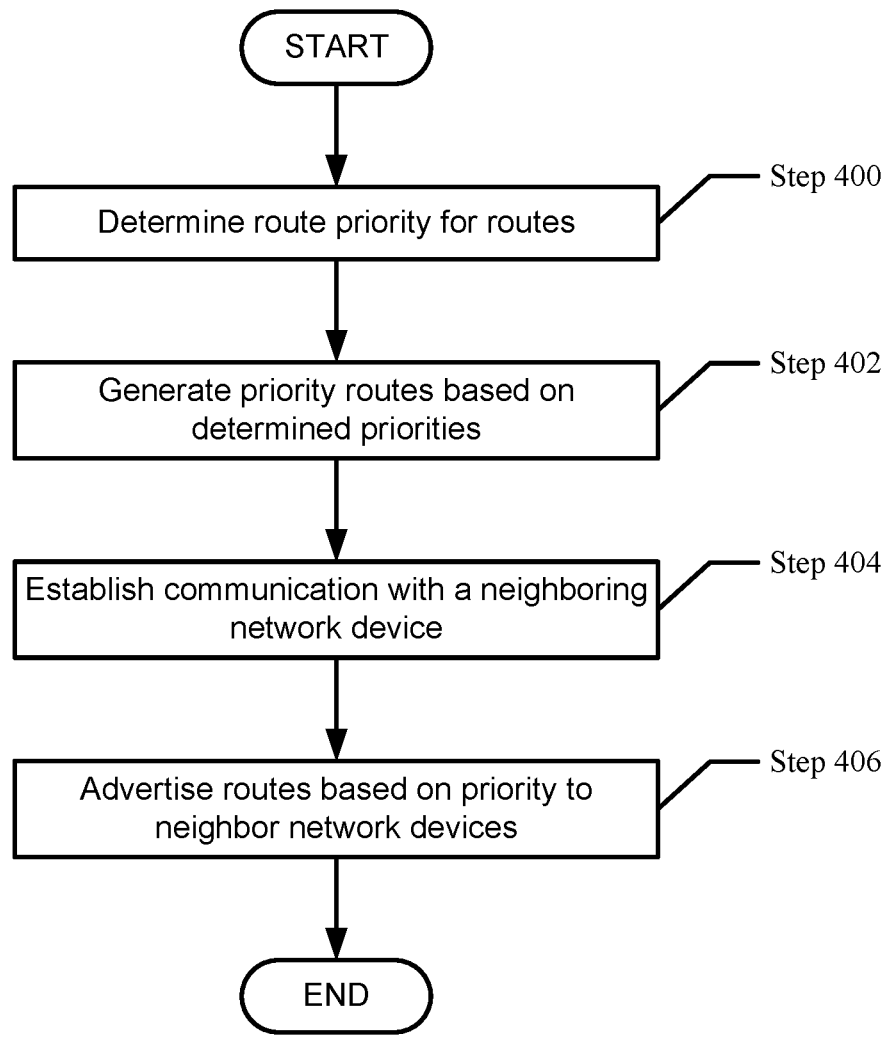
FIG. 4 shows a flow chart for distributing routes in order of priority in accordance with one or more embodiments disclosed herein.
Figure 5:
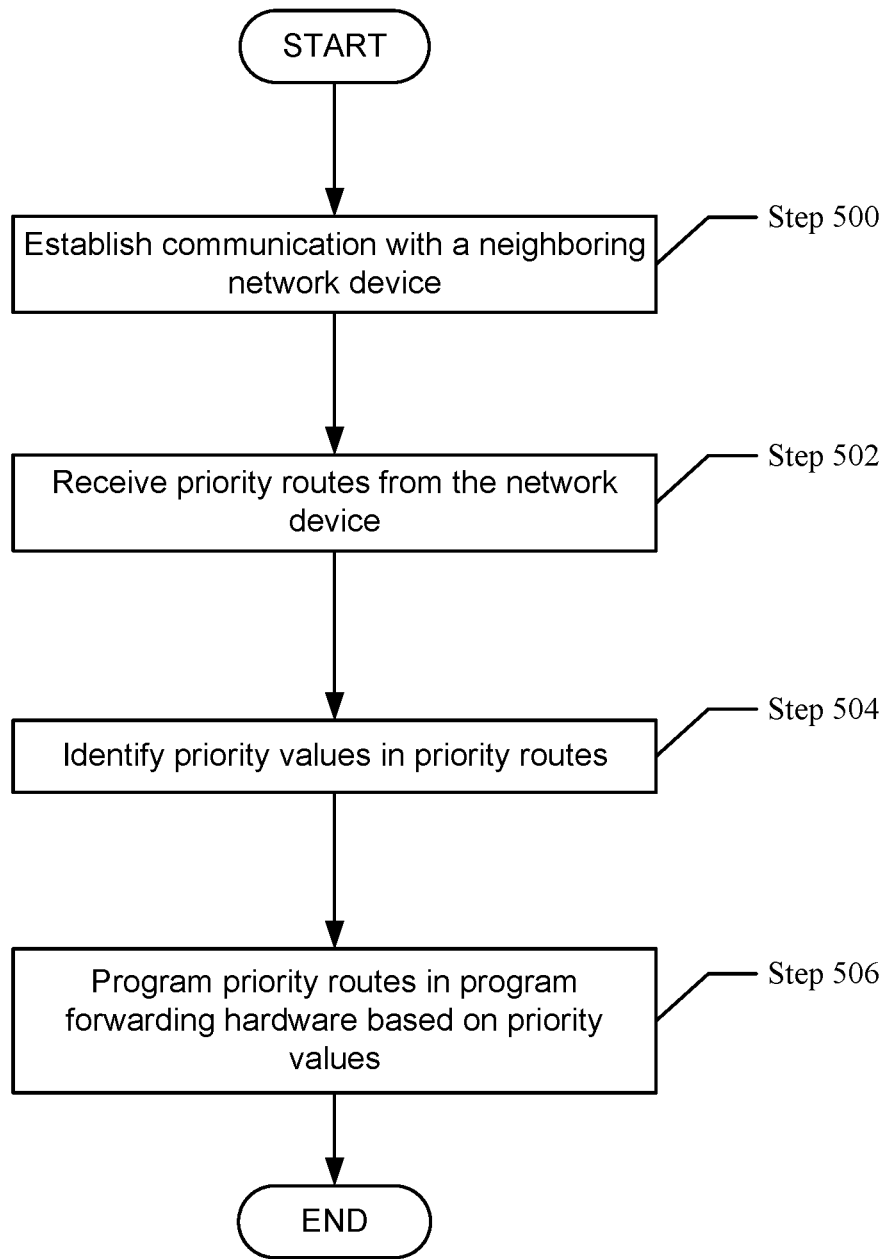
FIG. 5 shows a flow chart for receiving routes in accordance with one or more embodiments disclosed herein.
Figure 6:
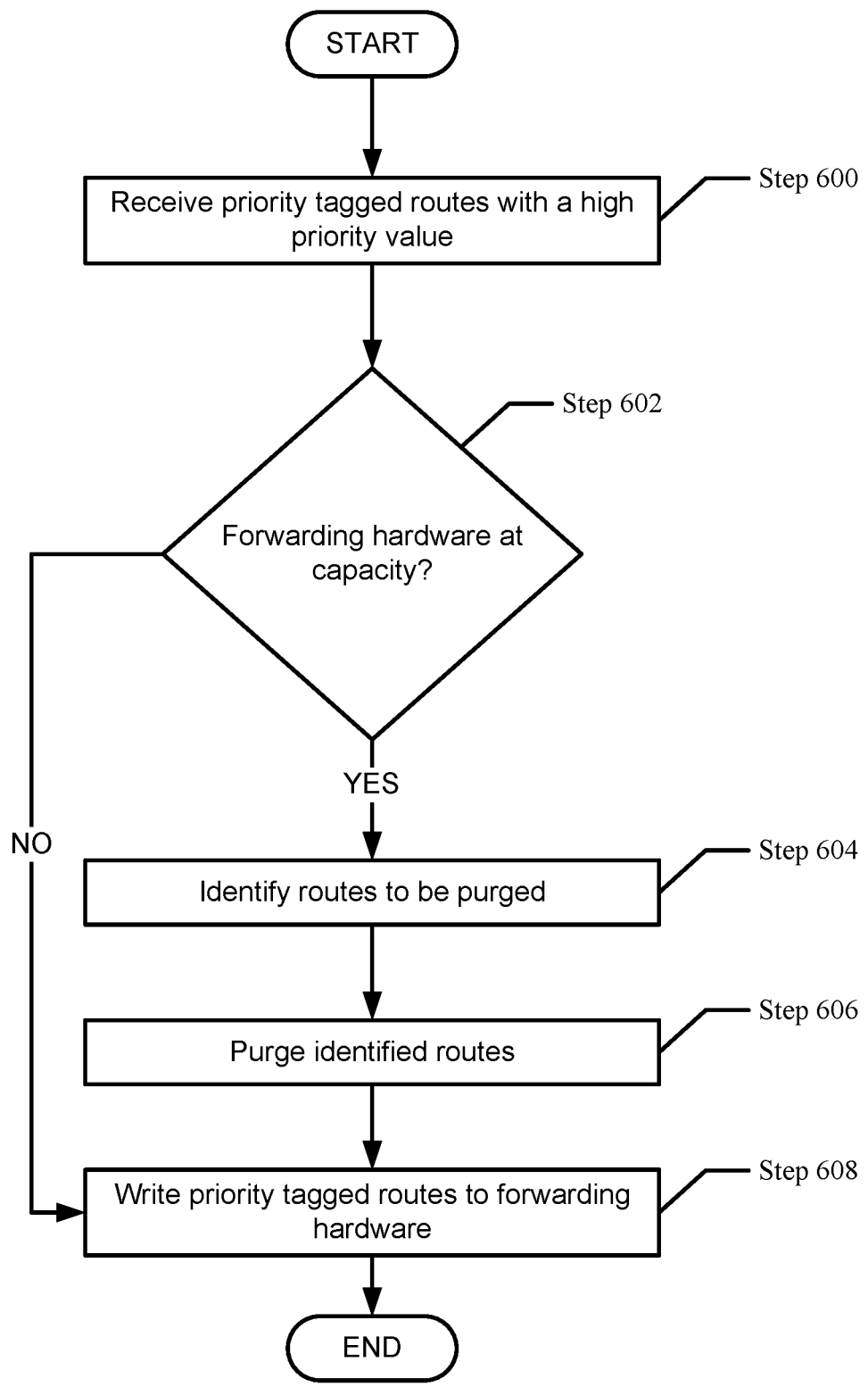
FIG. 6 shows a flow chart for storing routes in forwarding hardware in accordance with one or more embodiments disclosed herein.

Following the description of the data structures, a description of methods that may be performed by components of the system of FIG. 1 is provided with respect to FIGS. 4-6. Lastly, a description of a computing device that may be used to implement the system of FIG. 1 is provided with respect to FIG. 7.

FIG. 1 shows a diagram of an example system in accordance with one or more embodiments described herein. The system may include clients (e.g., 10, 12) that utilize services provided by network (20). The services provided by the network (20) may include, for example, network forwarding services for packets transmitted by clients (e.g., 10, 12). By forwarding packets (e.g., by providing packet forwarding services), network (20) may enable clients (e.g., 10, 12) to communicate with other devices.

To forward packets, network (20) may include network devices (22). Network devices (22) may be physical devices connected to any number of other devices. The network devices (22) may include functionality to (i) forward packets, (ii) obtain information regarding the network environment in which network devices (22) reside, and (iii) use the obtained information regarding the network environment to decide how to forward the packets. Network devices (22) may include any number of network devices and other types of devices. Network (20) is illustrated in FIG. 1 as including a specific number and arrangement of network devices for explanatory purposes only. In FIG. 1, operable connections are illustrated using lines terminated in arrows.

The arrangement of network device (22) in FIG. 1 may enable client X(10) to send packets to client Y (12). For example, client X(10) may send a packet destined for client Y (12) to network device A (24). Network device A (24) may, based on its understanding of the network environment (e.g., it being connected to both network device B (26) and network device (C) (28), and these network devices being connected to client Y (12)) and the control information included in the packet, determine that the packet should be forwarded to network device B (26). In turn, network device B (26) may forward the packet to client Y (12).

Any of the components of FIG. 1 may be connected by any combination and/or number of wired and/or wireless connections.

As discussed above, the system of FIG. 1 may include network devices (e.g., 24, 26, 28) that may provide packet forwarding services. Any of the devices of FIG. 1 may be implemented using computing devices. The computing devices may include, for example, mobile phones, tablet computers, laptop computers, desktop computers, servers, switches, and/or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing devices to perform the functions described in this application and/or all, or a portion, of the methods illustrated in FIGS. 4-6. The devices of FIG. 1 may be implemented using other types of computing devices without departing from the embodiments disclosed herein. For additional details regarding computing devices, refer to FIG. 7.

The devices of FIG. 1 may be implemented using logical devices without departing from the embodiments disclosed herein. For example, the devices of FIG. 1 may be implemented using virtual machines (or other types of logical entities) that utilize computing resources (e.g., provided by hardware devices) of any number of physical computing devices to provide their respective functionalities. Thus, a logical entity may be an entity that, for example, shares various hardware devices when providing its functionality. The devices of FIG. 1 may be implemented using other types of logical devices without departing from the embodiments disclosed herein.

In one or more embodiments disclosed herein, the network devices are implemented as switching devices such as switches or multilevel switches. A switching device may be a device that is adapted to facilitate network communications. A switching device may include a computing device.

While the system of FIG. 1 has been illustrated and described as including a limited number of specific components, a system in accordance with embodiments disclosed herein may include additional, fewer, and/or different components than those illustrated and described.

To further clarify aspects of network devices, a diagram of network device (200) is provided in FIG. 2.1. Any of the network devices of FIG. 1 may be similar to network device (200) illustrated in FIG. 2.1.

FIG. 2.1 shows a diagram of network device (200) in accordance with one or more embodiments described herein. Network device (200) may facilitate network communications. To do so, network device (200) may provide any number of functionalities, including packet forwarding functionality. Packet forwarding functionality may include (i) programming hardware devices (e.g., packet processors) which may be used to forward packets, (ii) obtaining information regarding the network environment in which network device (200) resides and through which packets may traverse, and (iii) forwarding packets using the hardware devices.

To provide packet forwarding functionality, network device (200) may include ports (202), switching module (206) that switches packets between ports (202), switching module manager (208) that manages the operation of switching module (206), and/or data structures stored in storage (210) maintained by switching module manager (208). Each of these components of network device (200) is discussed below.

Ports (202) may facilitate obtaining of packets from other devices. For example, ports (202) may be adapted to connect to other devices (e.g., may receive cabling to another device). Ports (202) may obtain packets from other devices via the operable connections. The ports (202) may be associated with corresponding communication endpoints.

Ports (202) may also facilitate the providing of packets to other devices. The ports (202) may provide the packets to other devices via the operable connections facilitated by the ports (202).

Switching module (206) may forward packets obtained via the ports (202) to other devices via the ports (202). For example, switching module (206) may direct packets received via one of ports (202) towards another of ports (202). Each of these ports may be connected to other devices. Consequently, switching the packets between these ports may cause the packets to be transmitted from a first device to a second device connected by the ports. Switching module (206) may selectively direct (e.g., switch) the packets in a manner that facilitates controlling the flow of packets across the network illustrated in FIG. 1.

Switching module (206) may be programmable. How switching module (206) is programmed may determine how network device (200) switches and/or forwards packets. For example, switching module (206) may receive data and make decisions regarding how to forward packets based on the data, the packets, and/or one or more algorithms for making switching decisions. For additional details regarding switching module (206), refer to FIG. 2.2.

Switching module manager (208) may manage the operation of switching module (206). Switching module manager (208) may manage the operation of switching module (206) by (i) updating, (ii) programing, and/or (iii) reprogramming the packet processors (or other devices that make packet forwarding decisions) of switching module (206). By doing so, switching module manager (208) may change the forwarding behavior of network device (200) by changing out of which ports received packets are sent (e.g., after an update, programming, reprogramming).

To manage the operation of switching module (206), switching module manager (208) may (i) monitor the operation of switching module (206), (ii) obtain information regarding the network environment in which network device (200) resides, and/or (iii) determine how to modify the operation of switching module (206) (e.g., by reprogramming/programming packet processors) based on the information obtained by switching module manager (208).

In one or more embodiments disclosed herein, switching module manager (208) is implemented using a hardware device including circuitry. Switching module manager (208) may include, for example, a digital signal processor, a field programmable gate array, and/or an application specific integrated circuit. The circuitry of the hardware devices may be adapted to provide the functionality of switching module manager (208). Switching module manager (208) may be implemented using other types of hardware devices without departing from embodiments disclosed herein.

In one or more embodiments disclosed herein, switching module manager (208) is implemented using computing code stored on a persistent storage that when executed by a processor causes the processor to perform the functionality of switching module manager (208). The processor may be a hardware processor including circuitry such as, for example, a central processing unit or a microcontroller. The processor may be other types of hardware devices for processing digital information without departing from the embodiments disclosed herein.

In one or more embodiments disclosed herein, storage (210) is implemented using devices that provide data storage services (e.g., storing data and providing copies of previously stored data). The devices that provide data storage services may include hardware devices and/or logical devices. For example, storage (210) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, storage (210) may include a memory device (e.g., a dual in line memory device) in which data is stored and from which copies of previously stored data are provided. In another example, storage (210) may include a persistent storage device (e.g., a solid state disk drive) in which data is stored and from which copies of previously stored data is provided. In a still further example, storage (210) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

Storage (210) may store data structures including the information discussed above. For example, storage (210) may include a switching module repository (not shown). Switching module repository may be implemented using one or more data structures that store information regarding the operation of switching module (206) and/or information regarding the network environment in which network device (200) resides. The stored information may be used by switching module manager (208) to modify the operation of switching module (206).

For example, the switching module repository may include information regarding the network environment in which network device (200) is disposed, information regarding how switching module (206) is programmed, the priority of routes, and/or other types of information. The information included in switching module repository may include any type and quantity of information, the information may be obtained and/or be updated by switching module manager (208) and/or other entities, and may include additional, different, and/or less information without departing from embodiments disclosed herein.

To determine how to switch packets, switching module manager (208) may perform one or more algorithms (e.g., a best path selection algorithm, network traffic distribution/balancing algorithm, etc.). The algorithms may take, as input, information included in the switching module repository (e.g., network topology/connectivity information). The output of the algorithms may be information that may be used to program switching module (206) to cause packets to be switched by switching module (206) in a desirable manner (e.g., in accordance with a predetermined method for forwarding packets that an administrator or other person may have selected). Additionally, the output of the algorithms may include information about how switching module (206) should be programmed in the event of a different network state, such as a failure of one or more of links (205). The additional information may be changed, for example, to next hops for packets received by switching module (206).

While network device (200) of FIG. 2.1 has been illustrated as including a limited number of specific components, a network device in accordance with embodiments disclosed herein may include additional, fewer, and/or different components.

As discussed above, network device (200) may include a switching module. FIG. 2.2 shows a diagram of switching module (206) in accordance with one or more embodiments disclosed herein. Switching module (206) may facilitate switching of packets between any number of ports (202).

Switching packets in accordance with one or more embodiments disclosed herein may be a process of directing packets received on a first port to a second port of network device (200). The first port may be connected to a first device and the second port may be connected to a second device. Consequently, packets that are switched may be received from the first device and transmitted towards the second device.

The packets may be switched based on, for example, the destinations of the packets and the programming of forwarding hardware (232) of packet processors (e.g., 230A, 230N).

For example, when a packet is received, control information of the packet may be used to identify how to switch the packet. One or more algorithms implemented by the packet processors (230A, 230N) may be used to match or otherwise link the control information to information that has been programmed into the forwarding hardware (232) of the packet processors. The packets may be switched based on additional and/or different information without departing from embodiments disclosed herein.

To perform switching, packet processors (230A, 230N) may obtain packets from ports (202) (e.g., sent by other devices connected to the ports via links (205A, 205L, 205N, 205Q, 205S), use their forwarding hardware (232) to determine out of which port to send each respective packet, and direct each of the respective packets towards the determined ports. Consequently, the packets may be sent to other devices via links connected to the determined ports.

For example, a packet may be received from another device via link A (205A). Link A (205A) may be connected to one of the ports (202). That port may be connected to packet processor A (230A). Packet processor A (230A) may use control information of the packet and its forwarding hardware (e.g., 232) to ascertain that the packet should be sent along link S (205S) to another device. To do so, the forwarding hardware (232) may specify out of which of the ports (202) the packet should be sent. Packet processor A (230A) may then send the packet out of that port so that the packet traverses link S (205S) towards the other device.

The determination made by packet processor A (230A) is based on the programming of its forwarding hardware (e.g., 232). Consequently, changing the programming of forwarding hardware (232) or updating the operation of the packet processors may update the forwarding behavior of network device (200, FIG. 2.1).

Packet processors (230A, 230N) may be implemented using one or more physical devices. A physical device (e.g., a chip, die, etc.) may include circuitry adapted to perform the functionality of packet processors (230A, 230N). In some embodiments disclosed herein, the circuitry may include programmable portions (e.g., forwarding hardware) that may be adapted to execute computing instructions (e.g., computer code) that cause the programmable portions of the circuitry to perform all, or a portion, of the functionality of packet processors (230A, 230N).

For example, forwarding hardware (232) may implement a packet processing pipeline that enables rapid switching determinations to be made. The packet processing pipeline may enable control information of the packets to be matched to information included in the forwarding hardware (232) to determine how to switch the packets. The programming pipeline may, for example, implement predetermined algorithms for making forwarding decisions that are adapted based on the information programmed into forwarding hardware (232). Consequently, the forwarding decisions made by the forwarding pipeline may be adapted to meet various network topologies.

The switching module (206) may include any number of packet processors. Each of the packet processors may process packets obtained from any number of ports.

Switching module (206) may perform all, or a portion, of the methods illustrated herein as part of providing the aforementioned functionality.

While packet processors (230A, 230N) have been illustrated as including a limited number of specific components, a packet processor in accordance with embodiments disclosed herein may include additional, fewer, and/or different components than those illustrated in FIG. 2.2.

While switching module (206) of FIG. 2.2 has been illustrated as including a limited number of specific components, a switching module may include additional, fewer, and/or different components without departing from embodiments disclosed herein.

Figure 3:
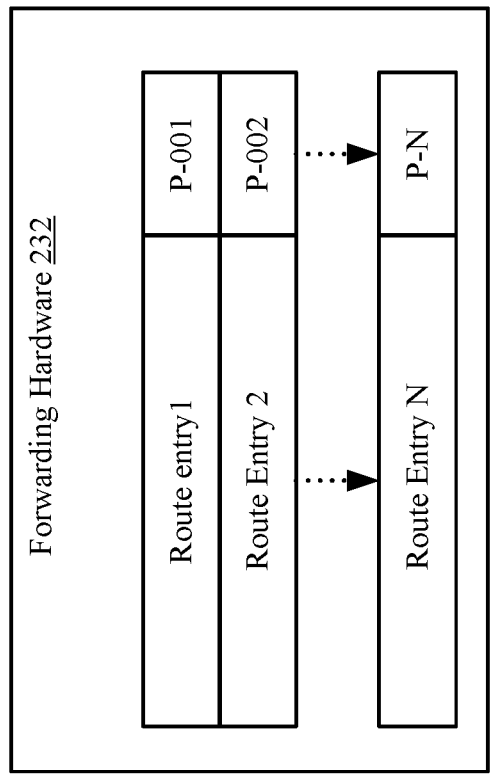
FIG. 3 shows a diagram of forwarding hardware in accordance with one or more embodiments disclosed herein.

As discussed above, packet processors may switch packets based on the programming of forwarding hardware (232). FIG. 3 shows a diagram of forwarding hardware (232) in accordance with one or more embodiments disclosed herein.

As discussed above, forwarding hardware (232) may perform one or more algorithms to determine how to switch packets. The algorithms may utilize information that is programmed into forwarding hardware (232) to make those decisions.

For example, forwarding hardware (232) may include programmable lookup tables. The algorithms employed by forwarding hardware (232) may operate on entries of the lookup tables when deciding how to switch packets. The tables may include any number of entries. Each of the entries may include any number of fields. The fields may include any number of sub-fields. In FIG. 3, each route entry in the forwarding hardware (232) has associated priority information. As explained above, the priority information may take the form of a tag or value (P-0001 . . . P-N) that indicates the criticality of the routes.

For example, the algorithms employed by forwarding hardware (232) may first match control information (and/or encapsulation headers or other types of control information added to the packet) of a packet to information in a table of the lookup tables to classify a packet. The classification may be stored in a field of an entry of the table. The entry of the table may also include information that may be matched against the control information (and/or other types of information that may be appended to the packet for control purposes such as labels, headers, etc.).

The classification may then be matched to information included in other tables to identify, for example, out of which port to send the packet, encapsulation information to add to the packet, and/or other steps of switching a packet.

In FIG. 3, only one table used by forwarding hardware (232) is illustrated for brevity. The forwarding hardware (232) may include other tables without departing from the scope of the disclosure.

In one or more embodiments disclosed herein, the storage of the forwarding hardware (232) is implemented using devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, the storage may include a memory device (e.g., a dual in line memory device) in which data is stored and from which copies of previously stored data are provided. In another example, the storage may include a persistent storage device (e.g., a solid state disk drive) in which data is stored and from which copies of previously stored data is provided. In a still further example, the storage may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

While forwarding hardware (232) has been illustrated and described as including tables, forwarding hardware in accordance with embodiments disclosed herein may include different types of data structures that include additional, different, and/or less information.

FIG. 4 shows a flow chart describing a method for advertising priority routes in accordance with embodiments disclosed herein. Embodiments of FIG. 4 are performed by a network device as described in FIG. 2.1. For example, embodiments of FIG. 4 may be performed by the switching module manager (208) of the network device. Other entities in the network device may perform the method of FIG. 4 without departing from embodiments disclosed herein.

While the various steps in the flowchart shown in FIG. 4 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 400, route priorities for routes are determined. A network operator may specify the priorities for routes and provide this information to the switching module manager. The network operator may specify route priority using one or more of the following mechanisms: (i) mapping of a routes to specific priorities, (ii) mapping of specific IP address ranges to specific priorities, (iii) one or more heuristics to map a route to a specific priority; and/or (iv) analyzing network traffic that is received and/or transmitted by the network device determining route priorities based on the analysis. Any other mechanisms may be used to determine the priority of a route without departing from the disclosure. The switching module manager may subsequently analyze routes that it has received in view of the information provided by the network operator to determine the priority (or relative priority) of one or more routes.

In step 402, priority routes are generated based on the identified priorities. Specifically, for each of the routes, a tag or flag is associated with the route (see e.g., FIG. 3), where the tag or flag reflects the route priority.

In step 404, communications are established with a neighboring network device. The communications may be associated with initializing or powering up of the neighboring network device. The communications may take the form of establishing a BGP secession in accordance with known protocols. Step 404 may be occurring in parallel to steps 400 and 402. In another embodiment, the priority routes (or at least the highest priority or most critical routes) are pre-programmed into the forwarding hardware (e.g., FIG. 3, 232). In such scenarios, the method may start at step 404.

In step 406, routes are advertised to the neighboring network device in an order based on the priority, with the highest priority routes advertised first. The routes may be advertised with or without a priority indication.

In some embodiments, the priority information is used to generate the order of the advertised routes, but not transmitted with the routes. In this manner, even if the neighboring network device is not capable of associating a priority with specific routes, the higher priority routes are received and established first in the neighboring network device. In the BGP example, the routes may be advertised using a BGP update. In these embodiments, the highest priority routes are advertised first, ensuring the most critical routes are initially programmed into the neighboring network device.

In some embodiments, the priority information may be advertised with the routes. For example, continuing the BGP example, community values provided by the BGP may be used to advertise the priority of routes.

The priority routes that are advertised in step 406 may be received by: (i) a network device that implements the method shown in FIG. 5 (i.e., the network device includes functionality to program priority routes based on their associated priority) or (ii) a legacy network device that has no notion of priority routes. In scenario (ii), the routes are processed by the receiving network device in the order in which they are received and, as such, the priority routes are advertised in order of priority.

FIG. 5 shows a flow chart in accordance with embodiments disclosed herein. Embodiments of FIG. 5 are performed by a network device as described in FIG. 2. For example, embodiments of FIG. 5 may be performed by a switching module manager (208) of one network device in conjunction with the embodiments of FIG. 4 being performed by a switching module manager (208) of another network device. In other words, embodiments of FIG. 4 may be implemented by the network device advertising the routes, while embodiments of FIG. 5 may be implemented by the network device receiving the advertised routes.

While the various steps in the flowcharts shown in FIG. 5 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 500, communications are established with a neighboring network device. Similar to step 404, the communications may be associated with initializing or powering up of the neighboring network device. In some embodiments, communications may take the form of establishing a BGP secession in accordance with known protocols.

In step 502, routes are received from the neighboring network device. The routes may be received in the order of priority in accordance with embodiments herein. The routes may be received as advertised from the neighboring network device.

In step 504, a priority determination is made with respect to the received routes. That is, a priority value is identified for each of the received routes. For example, the priority value may be determined based on the received order, user defined prefixes, etc. In some embodiments, BGP attributes may be used to determine the priority. For example, BGP communities can provide a user-defined community value that can be used to encode the priority for a given route. Thus, the hardware priority is derived from the community value of the route.

In step 506, the priority routes are programmed into the forwarding hardware based on the priority values. As demonstrated in FIG. 3, the forwarding hardware (232) is programmed to include a priority value in accordance with embodiments herein.

In accordance with embodiments disclosed herein, when writing routes to the forwarding hardware based on priority, part of the forwarding hardware may be reserved for high priority routes. In such scenarios, step 506 may include the additional processing as described in FIG. 6.

FIG. 6 shows a flow chart for storing routes in forwarding hardware in accordance with one or more embodiments disclosed herein. Embodiments of FIG. 6 are performed by a network device as described in FIG. 2. For example, embodiments of FIG. 6 may be performed by a switching module manager (208) of one network device. Other entities in the network device may perform the method of FIG. 6 without departing from embodiments disclosed herein.

While the various steps in the flowchart shown in FIG. 6 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 600, routes tagged with a high priority value are received to be written to the forwarding hardware. In step 602, it is determined if the forwarding hardware is at capacity. In some embodiments, the capacity may refer to the total available memory in the forwarding hardware. In other embodiments, the capacity may refer to a percentage of a hardware capacity of the forwarding hardware reserved for the higher priority routes.

If the hardware is not at capacity (No in step 602), the routes are written to the forwarding hardware in step 608.

If the hardware is at capacity (Yes in step 602), routes to be purged from the forwarding hardware are identified in step 604. The routes may be identified based on a priority of the routes or other route metrics, such as frequency of use (e.g., idle routes), or a prefix, etc. In embodiments, routes with the same priority that are actively carrying traffic are not be purged. The number of routes to be purged may be determined based on the number of high priority routes received for programming, available space in the forwarding hardware, and/or policies established.

In step 606, the identified routes of step 604 are purged from the forwarding hardware. The purged routes free sufficient memory space in the forwarding hardware to program the newly received high priority routes.

After the identified routes have been purged, the routes received in step 600 are written to the forwarding hardware based on the priority in step 608.

While FIG. 6 is directed to purging lower priority routes in favor of higher priority routes in the forwarding hardware, in other embodiments of the disclosure, the highest priority routes may be programmed into a reserved space. This reserved space may only be used by high(er) priority routes. Although this may not provide optimum utilization of forwarding hardware, it will ensure that high(er) priority routes always have a guaranteed space in the forwarding hardware.

Figure 7:
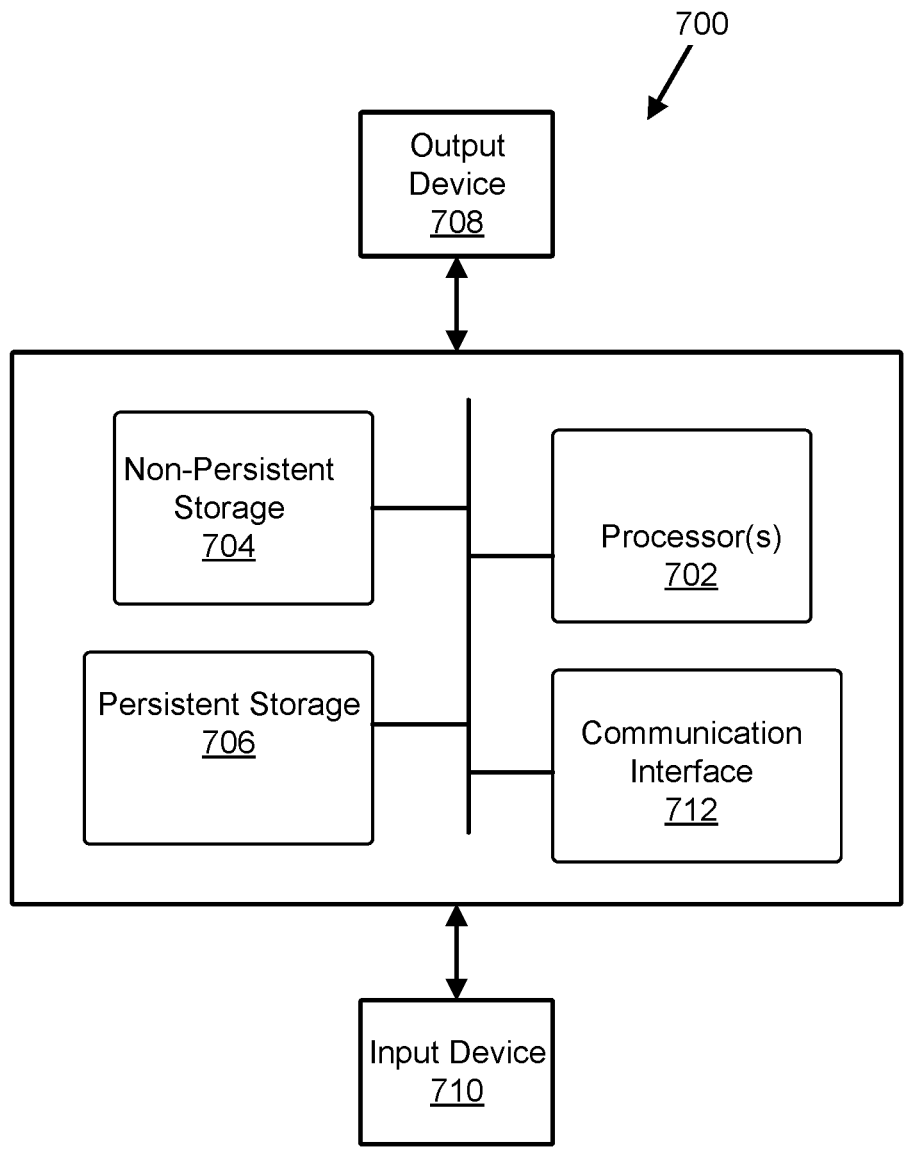
FIG. 7 shows a diagram of a computing device in accordance with one or more embodiments disclosed herein.

FIG. 7 shows a diagram of a computing device in accordance with one or more embodiments disclosed herein. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In embodiments disclosed herein, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In embodiments disclosed herein, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments advantageously prioritize the programming of routes to ensure that critical routes, such as routes associated with the infrastructure of the network, are established first. As such, the downtime during unplanned outages may be reduced. Furthermore, embodiments provide for the efficient programming of routes based on criticality, rather than when the route is received, which results in a better performing network.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for distributing routes in a network, the method comprising:
   storing, at forwarding hardware of a packet processor on a first network device, a set of entries for a first set of routes and a second set of routes;
   determining that the first set of routes has higher priority than the second set of routes;
   establishing, by the first network device, a border gateway protocol (BGP) session with a second network device;
   after establishing the BGP session, sending, by the first network device, the first set of routes via first advertisements to the second network device prior to sending the second set of routes via second advertisements to the second network device based on the first set of routes having higher priority than the second set of routes.

2. The method of claim 1, wherein each route in the first and second sets of routes is associated with a corresponding priority indicator.

3. The method of claim 2, wherein the priority indicators associated with the first and second sets of routes are based on route prefixes.

4. The method of claim 3, wherein the priority indicators associated with the first and second sets of routes are based on route metrics.

5. The method of claim 2, wherein sending the first set of routes comprises sending community values associated with the first set of routes and wherein the community values are derived from the priority indicators associated with the first set of routes.

6. The method of claim 2, wherein the priority indicators associated with the first and second sets of routes are stored on the forwarding hardware of the packet processor on the first network device.

7. The method of claim 1, wherein the first set of routes is written into the forwarding hardware based on an order in which routes in the first set of routes are received.

8. The method of claim 1, further comprising:
   prior to storing a portion of the set of entries for the first set of routes, determining that the forwarding hardware of the packet processor on the first network device is at capacity;
   prior to storing the portion of the set of entries for the first set of routes, identifying, based on the forwarding hardware being at capacity, routes in the forwarding hardware to be purged; and
   prior to storing the portion of the set of entries for the first set of routes, purging the identified routes from the forwarding hardware, wherein the identified routes have lower priority than the first set of routes.

9. The method of claim 8, wherein the forwarding hardware being at capacity is the forwarding hardware being at a percentage of a total capacity of the forwarding hardware.

10. A method for distributing routes in a network, the method comprising:
 establishing, by a first network device, a communication session with a second network device;
 programming, at forwarding hardware of a packet processor on the first network device, a set of entries for a first set of routes and a second set of routes, each entry in the set of entries having corresponding priority information and the second set of routes having lower priority than the first set of routes;
 after establishing the communication session, sending, to the second network device, the first set of routes;
 after sending the first set of routes, sending, to the second network device, the second set of routes; and
 receiving, from the second network device, packets after at least the first set of routes is installed in forwarding hardware of the second network device.

11. The method of claim 10, further comprising:
 determining that the second set of routes has lower priority than the first set of routes based on priority values associated with routes in the first and second sets of routes.

12. The method of claim 11, wherein the priority values are based on route prefixes.

13. The method of claim 11, wherein the priority values are based on frequency of route use.

14. The method of claim 11, wherein sending the first set of routes comprises sending community values associated with the first set of routes and wherein the community values are derived from the priority values.

15. The method of claim 10, wherein the priority information in each entry of the programmed set of entries comprises a tag or a value that indicates a level of criticality.

16. The method of claim 10, wherein the first and second sets of routes are each sent without the corresponding priority information.

17. A method for distributing routes in a network, the method comprising:
 establishing, by a first network device, a border gateway protocol (BGP) session with a second network device;
 after establishing the BGP session, receiving, from the second network device, a first set of routes;
 after receiving the first set of routes, receiving, from the second network device, a second set of routes that is less critical than the first set of routes;
 determining that forwarding hardware of the first network device is at capacity;
 identifying, based on the forwarding hardware being at capacity, routes in the forwarding hardware to be purged;
 purging the identified routes from the forwarding hardware;
 after purging the identified routes from the forwarding hardware, writing the first set of routes into the forwarding hardware; and
 after writing the first set of routes into the forwarding hardware, processing packets using the forwarding hardware.

18. The method of claim 17, wherein the first set of routes is written into the forwarding hardware based on an order in which routes in the first set of routes are received.

19. The method of claim 17, wherein the forwarding hardware being at capacity is the forwarding hardware being at a percentage of a total capacity of the forwarding hardware.

20. The method of claim 19, wherein the percentage of the total capacity of the forwarding hardware is a percentage of the total capacity of the forwarding hardware reserved for high priority routes.

* * * * *